United States Patent
Yasuda et al.

(10) Patent No.: US 6,544,464 B1
(45) Date of Patent: Apr. 8, 2003

(54) METHOD FOR MOLDING OF POLYMER

(75) Inventors: Shinzo Yasuda, Ushiku (JP); Masaharu Mukouyama, Ibaraki (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/449,248

(22) Filed: Nov. 24, 1999

(30) Foreign Application Priority Data

Nov. 24, 1998 (JP) .......................................... 10-332708
Nov. 24, 1998 (JP) .......................................... 10-332709

(51) Int. Cl.⁷ ................................................. B29B 7/00
(52) U.S. Cl. .................. 264/349; 264/211; 264/331.12
(58) Field of Search ........................... 264/349, 331.12, 264/211

(56) References Cited

U.S. PATENT DOCUMENTS

| | | | |
|---|---|---|---|
| 4,673,438 A | 6/1987 | Wittwer et al. .............. | 106/126 |
| 4,992,220 A | 2/1991 | Neri et al. ..................... | 264/28 |
| 5,142,062 A | 8/1992 | Knebel et al. ............... | 548/545 |
| 5,160,467 A | 11/1992 | Neri ............................ | 264/101 |
| 5,397,816 A | * 3/1995 | Reilly et al. ................. | 523/113 |
| 5,521,280 A | * 5/1996 | Reilly et al. ................. | 528/370 |

FOREIGN PATENT DOCUMENTS

| | | | |
|---|---|---|---|
| EP | 0 118 240 | 9/1984 | |
| EP | 0 767 191 A2 | 4/1987 | |
| EP | 0 658 586 A1 | 6/1995 | |
| EP | 0 692 357 A2 | 1/1996 | |
| JP | 5-39777 | 6/1993 | ........... B28C/45/00 |
| JP | 8-81565 | 3/1996 | .............. C08J/5/00 |
| JP | 08-239468 | 9/1996 | |
| JP | 08-302009 | 11/1996 | |
| JP | 09-003214 | 1/1997 | |
| JP | 9-31197 | 2/1997 | |
| JP | 09-165446 | 6/1997 | |
| JP | 09-235372 | 9/1997 | |
| JP | 09-278883 | 10/1997 | |
| JP | 09-302088 | 11/1997 | |
| JP | 10-139880 | 5/1998 | |
| JP | 10-147644 | 6/1998 | |
| JP | 10-168326 | 6/1998 | |
| JP | 10-287554 | 10/1998 | |
| JP | 10-292044 | 11/1998 | |
| WO | WO 97/18249 | 5/1997 | |
| WO | WO 99/05346 | 2/1999 | |

* cited by examiner

*Primary Examiner*—Mark Eashoo
(74) *Attorney, Agent, or Firm*—Fish & Richardson P.C.

(57) ABSTRACT

A method capable of molding by a simple procedure such a polymer as a polysuccinimide based (co)polymer or a protein whose glass transition temperature is very close to the decomposition temperature is provided. The method for the molding of a polymer contemplated by this invention comprises heating and melting a polymer whose glass transition temperature is very close to the decomposition temperature in the presence of a solvent having a low boiling point and a high dielectric constant ratio and then molding the resultant molten product.

6 Claims, No Drawings

METHOD FOR MOLDING OF POLYMER

BACKGROUND OF THE INVENTION

1. Field of the Invention

This invention relates to a method for the molding of a polymer. More particularly, this invention relates to a method for molding a polymer whose glass transition temperature is very close to the decomposition temperature.

This invention relates further to a method for the production of a polysuccinimide based polymer and/or copolymer having the high molecular weight thereof increased. More particularly, this invention relates to a method for conveniently producing a polysuccinimide based polymer and/or copolymer having a higher molecular weight than a polysuccinimide based polymer and/or copolymer as a raw material.

2. Description of the Related Art

In general, a polymer can be subjected to molding and processing in a glass state (molten state) by heating using glass transition. Such polymers as proteins and polysuccinimide based polymers and copolymers (which will be collectively referred to simply as "polysuccinimide based (co) polymers" in this specification), however, have the problem of being incapable of yielding to the thermal molding and processing via the glass transition temperature because they apparently exhibit very closely approximating decomposition temperatures and glass transition temperatures and, when heated to be molded, they are fated to be thoroughly decomposed before they are melted.

In these polymers, the polysuccinimide based (co) polymers promise as prospective precursors of biodegradable materials because the main aspartic acid chain formed by the ring-opening of an imide ring possesses biodegradability. The polyaspartic acid which is obtained by the hydrolysis of polysuccinimide, for example, is useful as a chelating agent, a scale preventing agent, a detergent builder, a dispersant, and etc.

To the polysuccinimide based (co)polymers, however, a molding method which is used for a thermoplastic resin can not be applied because they show no glass transition temperature below their decomposition temperatures and have no melting point below their thermal decomposition temperatures as described above. Thus, they impose a very rigid limit on the method to be adopted for the molding thereof. As means for molding a polysuccinimide based (co) polymer, a method which introduces a specific co-monomer component such as an aliphatic aminocarboxylic acid for the sake of molding a polysuccinimide based (co)polymer (JP-A-09-165,446), a method which modifies a polysuccinimide based (co)polymer in order to improve moldability thereof by reacting by addition a monoamine compound to the polysuccinimide based (co)polymer and heating the resultant addition product till dissolution (JP-A-10-139,880), and a method which comprises compatibilizing a polysuccinimide based (co) polymer with another polymer component to obtain a moldable composition (JP-A-10-168, 326) have been disclosed, for example. Besides the molding methods mentioned above, as a means generally adopted for molding a polysuccinimide based (co)polymer in an unmodified form, a method which effects the molding of a polysuccinimide based (co)polymer as dissolved in such an organic solvent as N,N-dimethyl formamide (DMF) (JP-A-09-3,214) has been known.

In the methods mentioned above, the methods for molding polysuccinimide based (co)polymers which are disclosed in JP-A-09-165,446, JP-A-10-139,880, and JP-A-10-168,326 entail operational complications by necessitating steps for modification of a polysuccinimide based (co) polymer, i.e., a step of introducing a specific co-monomer component in the main chain, a step of adding a monoamine, and a step of compatibilizing the (co)polymer with another polymer component, respectively, and prove unfavorable commercially in consideration of quantity production. Further, the method which relies on such an organic solvent as DMF to attain necessary dissolution has the problem that since the organic solvent which is usable for the dissolution of a polysuccinimide based (co)polymer has a high boiling point and exhibits high affinity as well for the polysuccinimide based (co)polymer, the removal of the organic solvent from the molded product which has been desired earnestly in due consideration of the conservation of safety is attained only with difficulty.

In such circumstances, the desirability for developing a method which can easily obtain a molded article of a polysuccinimide based (co)polymer containing no organic solvents has been finding enthusiastic recognition.

The polysuccinimide based (co)polymers which are at present available in the market fit only limited applications because they have relatively low molecular weights falling in the approximate range of 6000 to 7000 at most. Even when they happen to find applications, the products thereof do not exhibit very high qualities.

Various methods, therefore, have been attempted with a view to accomplishing production of polysuccinimide based (co)polymers having higher molecular weights. For example, a method which comprises polycondensating aspartic acid in the presence of a specific amount of an acid catalyst such as phosphoric acid and sulfuric acid (JP-A-08-239,468), a method which comprises subjecting such an amino acid as aspartic acid or glutamic acid to graft polymerization to a polyfunctional polymer such as polyaspartic acid (salt) in the presence of a catalyst such as phosphoric acid in an aliphatic sulfur-containing organic solvent such as sulfolane or methylsulfonic acid to obtain a polysuccinimide based (co)polymer (JP-A-09-235,372), a method which comprises polycondensing aspartic acid, maleamic acid, or the reaction product of maleic acid with ammonia in the presence of a phosphorous compound thereby obtaining a polysuccinimide based (co)polymer of a high molecular weight (JP-A-09-278,883), a method which comprises adding a catalyst and a polymerization accelerator in respectively specified amounts to a polymerization system and polymerizing the resultant mixture in a substantially solid state while stirred to obtain a polysuccinimide based (co) polymer of a high molecular weight (JP-A-09-302,088), and a method which comprises polycondensing a polycondensing system such as aspartic acid, maleamic acid, or the reaction product of maleic acid with ammonia with a compound having two or more oxazoline structures in its molecular unit thereof added as a chain extender, to obtain a polysuccinimide based (co)polymer (JP-A-10-147,644) have been known. In addition to these methods, JP-A-08-302,009 discloses a method for the treatment of a polysuccinimide, characterized by subjecting polysuccinimide to the heat treatment in an aqueous medium of a pH level of not more than 6, preferably in water, at a temperature of not lower than 50° C. and lower than 150° C.

The reactions of polymerization (or polycondensation) effected according to the methods disclosed in JP-A-08-239, 468, JP-A-09-235,372, JP-A-09-278,883, JP-A-09-302, 0088, and JP-A-10-147,644, however, do not necessarily deserve to be called a satisfactory process for commercial production due to the complication of the process and the high cost of the catalyst to be used. In addition to the defects mentioned above, the methods taught by the patent publications mentioned above require the heating to be performed in an organic solvent and, as a result, suffer persistence of the organic solvent in the produced polysuccinimide based (co)polymer, which organic solvent, depending on the purpose of use, is preferably removed completely from the product because it does not bring about any good to the safety. Since the organic solvent has a high boiling point and exhibits high affinity for a polysuccinimide based (co) polymer as well, however, it is extremely difficult to attain required removal thereof. Thus, the methods disclosed in the above patent publicaitons have the problem of inevitably limiting the applicaitons to be found therefor.

Among the methods mentioned above, the method which is disclosed in JP-A-08-302,009 can be favorably used in terms of the safety of the product because it uses an aqueous medium such as water which has a pH level of not more than 6 in place of an organic solvent. According to the method disclosed in JP-A-08-302,009, the polysodium aspartates which are produced in Example 5 and Control 2 and in Example 6 and Control 4, the pairs each using the same starting raw materials, have weight average molecular weights (Mw) of 10,000 in Example 5 and 14,000 in Control 2 and 2,500 in Example 6 and 5,000 in Control 4. From the results obtained by these experiments which used the same raw materials, the products obtained by the method disclosed in JP-A-08-302,009 show decreases in weight average molecular weights in some cases. Thus, this method has the problem of possibly failing to attain an increase in molecular weight as aimed at.

While the development of a method capable of producing a polysuccinimide based (co)polymer of a high molecular weight inexpensively by a simple process has been craved for, it remains yet to be realized.

SUMMARY OF THE INVENTION

An object of this invention, therefore, is to provide a method which is capable of molding by a simple procedure such polymers as polysuccinimide based (co)polymers and proteins whose glass transition temperature is very close to the decomposition temperature.

Another object of this invention is to provide a method which is capable of molding by a simple procedure without requiring the use of an organic solvent such polymers as polysuccinimide based (co)polymers and proteins whose glass transition temperature is very close to the decomposition temperature.

Yet another object of this invention is to provide a convenient method for obtaining a polysuccinimide based (co)polymer of a high molecular weight by increasing the molecular weight of a polysuccinimide based (co)polymer as a raw material.

The present inventors, after pursuing a diligent study with a view to fulfilling the objects mentioned above, have found that when a polymer whose glass transition temperature closely approximates its decomposition temperature, such as a polysuccinimide based (co) polymer, which is not melted at normal temperature under normal pressure is heated in the presence of a solvent of a low boiling point and a high dielectric constant ratio such as water, it assumes a fluidized (partially molten) state without being substantially decomposed at a reaction temperature falling in such a wide range as of 90° to 300° C. (the substance in this state will be occasionally referred to simply as "fluidized substance" in this specification) and that when the polysuccinimide based (co)polymer in this fluidized state is heated, it becomes melted without being substantially decomposed and consequently a polymer in the melted state can be manufactured easily as a molded product aimed at.

In addition to the above knowledge, the present inventors, after continuing the diligent study with a view further to accomplishing the objects mentioned above, have found that when the polysuccinimide based (co)polymer in the fluidized state mentioned above is heated in the presence of a chain extender and a solvent of a low boiling point and a high dielectric constant ratio, the molecular weight of the polysuccinimide based (co)polymer as the raw material can be easily increased. This invention has been perfected based on this knowledge.

To be specific, the objects of this invention can be attained by a method for the molding of a polymer whose glass transition temperature is very close to the decomposition temperature which method comprises heating and melting the polymer in the presence of a solvent having a low boiling point and a high dielectric constant ratio and then molding the molten product.

The yet another object of this invention can be further attained by a method for the production of a high molecular polysuccinimide based polymer and/or copolymer, which method comprises heating a polysuccinimide based polymer and/or copolymer in the presence of a chain extender and a solvent of a low boiling point and a high dielectric constant ratio thereby increasing the molecular weight of said polysuccinimide based polymer and/or copolymer.

According to this invention, a polymer whose glass transition temperature is very close to the decomposition temperature such as a polysuccinimide based (co)polymer and a protein can be rendered moldable in an expected shape by such a simple procedure without requiring any use of an organic solvent as by heating and melting the polymer in the presence of a solvent having a low melting point and a high dielectric constant ratio. Besides the merit mentioned above, the polymer can be rendered moldable in an expected shape by such a simple procedure without requiring any use of an organic solvent and without entailing any decomposition, namely without any decrease of the molecular weight, of the polymer as by heating and melting the polymer in the presence of a solvent having a low melting point and a high dielectric constant ratio, and a chain extender and/or an acid catalyst.

Further, according to this invention, by heating a polysuccinimide based (co)polymer in the presence of a chain extender and a solvent having a low boiling temperature and a high dielectric constant ratio, the molecular weight of the polysuccinimide based (co)polymer as the raw material can be easily increased without requiring use of an organic solvent. In addition to the merit mentioned above, the increase of the molecular weight of the polysuccinimide based (co)polymer can be attained more significantly by heating the polysuccinimide based (co)polymer in the presence of a chain extender, a solvent having a low boiling point and a high dielectric constant ratio, and an acid catalyst.

The above and other objects, features, and advantages of the present invention will become clear from the following description of the preferred embodiments.

DESCRIPTION OF THE PREFERRED EMBODIMENTS

According to the first aspect, this invention is to provide a method for the molding of a polymer whose glass transition temperature is very close to the decomposition temperature (hereinafter occasionally referred to simply as "a polymer"), which comprises heating and melting the polymer in the presence of a solvent having a low boiling point and a high dielectric constant ratio, and molding the resultant molten product.

The raw material to be used in this invention is referred to as a polymer whose glass transition temperature is very close to the decomposition temperature. As concrete examples of the polymer which answers the description, proteins such as casein, collagen, gelatin, gluten, keratin, soybean protein, cellulose and silk fibroin and polysuccinimide based polymers and copolymers may be cited. In these polymers, cellulose and polysuccinimide based polymers and copolymers, in particular, polysuccinimide based polymers and copolymers may be advantageously used in consideration of such factors as wide range of applications, excellent properties represented by biodegradability.

The polysuccinimide based (co)polymer which can be advantageously used as the raw material in this Invention does not need to be particularly discriminated but is only required to have as a repeating unit the succinimide ring represented by the following formula:

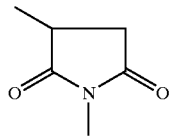

The polysuccinimide based (co)polymer to be used in this invention may embrace all the compounds that are generally designated as polysuccinimide based (co)polymers. As concrete examples thereof, polysuccinimides, succinimide copolymers having a repeating unit other than the succinimide ring, and polysuccinimide derivatives obtained by modifying these polymers or copolymers as by suitably opening the succinimide rings thereof may be cited. A repeating unit other than the succinimide ring which may contained in the polysuccinimide based copolymer does not need to be particularly discriminated but is only required to have at least two functional groups capable of reacting with an amino group or carboxyl group or salts thereof. As concrete examples of the repeating unit other than the succinimide ring which may contained in the polysuccinimide based copolymer, amino acid, hydroxycarboxylic acid, hydroxycarboxylic acid amide, ammonium salt of hydroxycarboxylic acid, aminocarboxylic acid, aminocarboxylic acid amide, ammonium salt of aminocarboxylic acid, dicarboxylic acid, ammonium salt of dicarboxylic acid, and dicarboxylic acid amide may be cited. Among other repeating units mentioned above, amino acid, hydroxycarboxylic acid, and aminocarboxylic acid can be used particularly advantageously. These repeating units may be incorporated in the polysuccinimide based copolymer either singly or in the form of a combination of two or more members arranged in a blocked form or random form. When the polysuccinimide based copolymer is used, though the content of the repeating unit other than the succinimide ring does not need to be particularly limited, it may be generally not more than 50%, preferably not more than 45%. Among other polysuccinimide based (co)polymers cited above, the polysuccinimide may be used particularly advantageously in this invention. To be used as the raw material in this invention, the polysuccinimide based (co)polymers may be used singly or in a mixed form of two or more species of polysuccinimide based polymers and/or polysuccinimide based copolymers, or optionally in a form further containing other components.

This invention does not particularly discriminate the polysuccinimide based (co)polymer to be used as the raw material on account of the magnitude of the molecular weight thereof. It allows the use of any polysuccinimide based (co)polymer without reference to the molecular weight thereof. Specifically, the lower limit of the molecular weight of the polysuccinimide based (co)polymer may be set generally at 300, preferably at 500, and more preferably at 1,000. Then, the upper limit of the molecular weight of the polysuccinimide based (co)polymer may be set generally at 1,000,000, preferably at 500,000, and more preferably at 100,000. Polysuccinimide based (co)polymers which have molecular weights particularly in the approximate range of 6,000 to 7,000 can be easily produced or may be commercially available and, therefore, can be used in their unmodified form in the present invention. The molecular weights which are mentioned in the present specification represent the numerical values which are determined by the same method as described in the working examples to be described herein below.

This invention does not particularly limit the method to be used for the preparation of the polysuccinimide based (co)polymer. The production can be attained, for example, by such a well-known method as of heating L-aspartic acid in the presence or absence of phosphoric acid (JP-B-48-20,638 and P. Neri et al., J. Med. Chem., 16, 893 (1973)). This method can similarly use ammonium (poly)aspartate, ammonium maleate, or maleic acid amide as the starting raw material, as well as aspartic acid.

The method for molding according to this invention has an essential requirement of comprising a step of heating and melting a polymer which glass transition temperature can not be determined in the presence of a solvent having a low boiling temperature and a high dielectric constant ratio and a step of molding the resultant molten product. In this case, the polymer such as a polysuccinimide based (co)polymer as the raw material herein may be fluidized to form a fluidized substance by being heated in the presence of a solvent having a low boiling temperature and a high dielectric constant ratio as described above. The terms "fluidized" and "fluidized substance" as used in the present specification mean that the polymer as the raw material is partly dissolved into the solvent having a low boiling temperature and a high dielectric constant ratio and partly melted in itself and consequently caused to form a homogeneous viscous substance (resembling starch syrup) as a whole. They also refer to the state which the produced substance assumes as mentioned above.

The solvent having a low boiling temperature and a high dielectric constant ratio and used in the present invention does not need to be particularly limited but is only required to satisfy the definition mentioned above. The lower limit of the boiling temperature of the solvent to be advantageously used in this invention may be set preferably at 50° C., more preferably at 60° C., and most preferably at 70° C. Then, the upper limit of the boiling temperature may be set preferably at 150° C., more preferably at 145° C., and most preferably at 120° C. The dielectric constant ratio which the solvent advantageously used in this invention exhibits at 20° C. may be preferably not less than 20, more preferably not less than 25, and most preferably not less than 30. If the boiling temperature of the solvent is less than 50° C., the shortage would be at a disadvantage in preventing the polysuccinimide based (co)polymer as the raw material from being thoroughly fluidized in the solvent. Conversely, if the boiling temperature of the solvent exceeds 150° C., the excess would be likewise at a disadvantage in rendering difficult the removal of the solvent remaining after the reaction. If the dielectric constant ratio of the solvent at 20° C. is less than 20, the shortage would be at a disadvantage in degrading the affinity of the polysuccinimide based (co)polymer as the raw material for the solvent and consequently markedly lowering the homogeneity during the reaction.

As concrete examples of the solvent having a low boiling temperature and a high dielectric constant ratio which can be used in this invention, water, 2,6-difluoropyridine, formic acid, nitromethane, acetonitrile, acrylonitrile, 2-fluoropyridine, methanol, ethanol, isopropyl alcohol, and acetone may be cited. Among other solvents mentioned above, water and formic acid may be used advantageously herein and, in consideration of the obviation of the necessity for a special device for drying, water may be used especially preferably. In this invention, the solvents mentioned above may be used either singly or in a mixed or dispersed form of two or more members.

Alternatively, according to this invention, a solvent which is obtained by mixing or dispersing another solvent having a boiling temperature and/or a dielectric constant ratio deviating from the preferred ranges contemplated by this invention with or in any of the solvents cited above in such a ratio as to adjust the boiling temperature and the dielectric constant ratio within the preferred ranges may be used as the solvent of a low boiling temperature and a high dielectric constant ratio according to this invention. In the case of a solvent which has a boiling temperature in the range of 50° to 150° C. and yet has a dielectric constant ratio of less than 20, for example, the solvent conforming to this invention may be prepared by mixing or dispersing this solvent with or in the aforementioned solvent having a low boiling temperature (50° to 150° C.) and a high dielectric constant ratio (not less than 20) at such a ratio as to adjust the dielectric constant ratio to a level of not less than 20. As concrete examples of the another solvent which have a boiling temperature and/or a dielectric constant ratio deviating from the preferred ranges according to this invention, hexane, toluene, and ethyl acetate may be cited.

The amount of the solvent of a low boiling temperature and a high dielectric constant ratio to be used in this invention does not need to be particularly restricted but is only required to fluidize the polymer as the raw material. Specifically, the lower limit of the amount of the solvent of a low boiling temperature and a high dielectric constant ratio to be used may be set generally at 0.1, preferably at 0.2, and more preferably at 0.3 by weight ratio based on the amount of the polymer taken as 1. The upper limit of the amount of the solvent of a low boiling temperature and a high dielectric constant ratio to be used may be set at 100, preferably at 50, more preferably at 20, and most preferably at 10 by weight ratio based on the amount of the polymer taken as 1. In this case, if the amount of the solvent of a low boiling temperature and a high dielectric constant ratio to be used is less than 0.1, the shortage would be at a disadvantage in preventing the polymer as the raw material from being thoroughly fluidized and the system from acquiring homogeneity. In contrast, if the amount of the solvent of a low boiling temperature and a high dielectric constant ratio to be used exceeds 100, the excess would be likewise at a disadvantage in preventing the polymer as the raw material from acquiring sufficient increase in the molecular weight and not doing any good economically. Particularly when the solvent of a low boiling temperature and a high dielectric constant ratio happens to be water, the lower limit of the amount of water to be used may be set preferably at 0.1, more preferably at 0.2, and most preferably at 0.3, by weight ratio based on the amount of the polymer taken as 1. Then, the upper limit of the amount of water to be used may be set preferably at 10, more preferably at 2, and most preferably at 1.5 by weight ratio based on the amount of the high molecular weight taken as 1.

The molding method according to the present invention is characterized by heating the polysuccinimide based (co)polymer in the presence of a solvent having a low boiling temperature and a high dielectric constant ratio thereby imparting thereto a fluidized state which facilitates molding. The heating temperature to be used in this case may be variable with the kind of polymer to be used as the raw material and the kind of the solvent of a low boiling temperature and a high dielectric constant ratio. It does not need to be particularly restricted but is only required to permit forming of the fluidized substance of the polymer as the raw material. The lower limit of the heating temperature may be set generally at 50° C., preferably at 60° C., more preferably at 70° C., and most preferably at 80° C. Then, the upper limit of the heating temperature may be set generally at 300° C., preferably at 250° C., more preferably at 210° C., and most preferably at 200° C. In this case, if the heating temperature is less than 50° C., the shortage would be at a disadvantage in bringing about no thorough fluidization of the polymer as the raw material but suffering a part thereof to be dispersed in its original form of powder, not allowing the reaction to proceed easily, and preventing the product aimed at from acquiring homogeneity. In contrast, if the heating temperature exceeds 300° C., the excess would be likewise at a disadvantage in doing no good economically as evinced by inducing decomposition of the polymer as the raw material and degradation of the thermal efficiency. The shortest reaction time (required for heating and fluidization) may be set generally at one minute and preferably at five minutes and the longest reaction time may beset generally at 72 hours and preferably at 48 hours. When the polymer is a polysuccinimide based (co)polymer and the solvent of a low boiling temperature and a high dielectric constant ratio is water, the lower limit of the heating temperature may be set generally at 100° C., preferably at 110° C., and more preferably at 130° C. and the upper limit of the heating temperature may be set generally at 250° C., preferably at 210° C., and more preferably at 180° C. The shortest heating time may be set generally at one minute and preferably at five minutes and the longest heating time may be set generally at 72 hours and preferably at 48 hours.

In the method of this invention, the other reaction conditions may be varied with the kind of the polymer to be used as the raw material and the kind of the solvent of a low boiling temperature and a high dielectric constant ratio and may be properly selected to suit the occasion. While the reaction may be performed under pressure of any status such as, for example, an increased pressure, a normal pressure, or a reduced pressure, the temperature and the pressure may be desirably maintained at respectively constant levels throughout the course of the reaction in consideration of the stability of the product in quality. More desirably, the refluxing temperature of the solvent is set at the level which exists at the reaction temperature under the reaction pressure of the reaction system.

In this invention, for the purpose of preventing the molecular weight of the polymer as the raw material, particularly the polysuccinimide based (co)polymer, from decreasing, the heating and melting process of the polymer may be preferably performed in the presence of a chain extender and/or an acid catalyst. The term "a chain extender" as used in the present specification means an organic compound which has a functional group capable of reacting with an amino group and/or carboxyl group and is capable of reacting with the polymer such as, for example, a polysuccinimide based (co)polymer to form a repeating unit.

The chain extender which can be optionally used in this invention is not particularly limited but is only required to have at least two functional groups capable of reacting with the amino group or carboxyl group or salts thereof. Any of the well-known chain extenders may be used on the condition that it satisfy the requirement just mentioned. As concrete examples of the chain extender which is usable herein, dicyclohexyl carbodiimide, amino acid, hydroxycarboxylic acid, hydroxycarboxylic acid amide, ammonium salt of hydroxycarboxylic acid, aminocarboxylic acid, aminocarboxylic acid amide, ammonium salt of aminocarboxylic acid, dicarboxylic acid, ammonium salt of dicarboxylic acid, dicarboxylic acid amide, monoammonium aspartate, diammonium aspartate, aspartic acid monoamide, aspartic acid diamide, monoammonium maleate, diammonium maleate, maleic acid monoamide, maleic acid diamide, monoammonium fumarate, diammonium fumarate, fumaric acid monoamide, fumaric acid diamide, polysuccinimide, and polyaspartic acid may be cited. Among other chain extenders cited above, polysuccinimide and aspartic acid may be used particularly advantageously.

The acid catalyst which can be optionally used in this invention is not particularly limited but may be selected among conventional acid catalysts. As concrete examples of the acid catalyst which is usable herein, sulfuric acid, phosphoric acid, boric acid, paratoluenesulfonic acid, phosphorous acid, and phosphorous esters may be cited. Among other acid catalysts mentioned above, phosphoric acid and boric acid may be particularly advantageously used.

When the polymer used as the raw material in this invention is heated and melted in the presence of a chain extender, the amount of the chain extender to be used can be properly decided, depending on the kinds and amounts of the raw material, solvent, and acid catalyst to be used. When the polymer is a polysuccinimide based (co)polymer, for example, the lower limit of the amount of the chain extender may be set preferably at 0.1% by weight, more preferably at 0.5% by weight, based on the amount of the polysuccinimide based (co)polymer, and the upper limit thereof may be set preferably at 100% by weight, more preferably at 50% by weight, based on the amount of the polysuccinimide based (co)polymer.

When the polymer used as the raw material in this invention is heated and melted in the presence of an acid catalyst, the amount of the acid catalyst to be used may be likewise decided properly, depending on the kinds and amounts of the raw material, solvent, and chain extender. When the polymer is a polysuccinimide based (co)polymer, for example, the lower limit of the amount of the acid catalyst to be-used may be set preferably at 0.05% by weight, more preferably at 0.1% by weight, based on the amount of the polysuccinimide based (co)polymer, and the upper limit thereof may be set preferably at 100% by weight, more preferably at 50% by weight, based on the amount of the polysuccinimide based (co)polymer. The times at which the chain extender or the acid catalyst are added to the polymer as the raw material do not need to be limited particularly. The chain extender and the acid catalyst may be collectively added together with the polymer or they may be added collectively or sequentially to the polymer.

This invention allows the polymer to be heated and melted together with other molding auxiliaries. As concrete examples of the other molding auxiliaries which are usable herein, inorganic fillers such as zeolite, talc, glass beads, magnesium carbonate, calcium carbonate, silica, alumina, and clay; organic fillers such as polyethylene succinate, polybutylene succinate, polyhydroxybutyric acid, polylactic acid, and polyglutamic acid; and organic acid metal salts such as magnesium stearate may be cited. When the other molding auxiliaries are present, the amounts thereof to be used may be properly decided, depending on the kinds and amounts of the raw material, solvent, chain extender, and acid catalyst to be used. When the polymer is a polysuccinimide based (co)polymer, for example, the lower limit of the amount of such other forming auxiliaries to be added may be set preferably at 1% by weight, more preferably at 3% by weight, and most preferably at 5% by weight, based on the amount of the polysuccinimide based (co)polymer, and the upper limit thereof may be set preferably at 90% by weight, more preferably at 80% by weight, and most preferably at 50% by weight, based on the amount of the polysuccinimide based (co)polymer. The time at which the other molding auxiliaries are added to the polymer as the raw material does not need to be particularly limited. The other molding auxiliaries may be collectively added in advance together with the polymer or they may be added collectively or sequentially to the polymer.

Since the polymer which has been heated and melted by the method of this invention as described above can be in a fluidized state, it can be easily molded in an expected shape by any of the known methods such as, for example, extrusion molding, cast molding, vacuum molding, and sheet forming. The molded product consequently obtained merits high safety. Further, since the polymer as the raw material, particularly the polysuccinimide based (co)polymer, undergoes no decomposition or suffers from no decrease of molecular weight during the course of heating and melting process, the molded product can effectively maintain the expected properties. The shape of the molded product obtained by the method of this invention is not particularly limited but may be properly selected, depending on the purpose of use.

According to the second aspect, the present invention is to provide a method for the production of a high molecular polysuccinimide based polymer and/or polysuccinimide based copolymer, which method comprises heating a polysuccinimide based polymer and/or copolymer in the presence of a chain extender and a solvent having a low boiling temperature and a high dielectric constant ratio.

In the aspect mentioned above, the terms "polysuccinimide based (co)polymer", "chain extender", and "solvent of a low boiling temperature and a high dielectric constant ratio" have the same definitions as in the first aspect mentioned previously.

The method of production according to the second aspect mentioned above is characterized by heating a polysuccinimide based (co)polymer in the presence of a solvent having a low boiling temperature and a high high dielectric constant ratio thereby fluidizing the (co)polymer and then enabling the polysuccinimide based (co)polymer in such a fluidized state to acquire an increase in the molecular weight thereof by means of the chain extender. The heating temperature to be used at this time may be varied with the kinds of polysuccinimide based (co)polymer as the raw material, chain extender, and solvent of a low boiling temperature and a high dielectric constant ratio to be used. It has no particular limit but is only required to allow the polysuccinimide based (co)polymer as the raw material to form the fluidized substance. The lower limit of the heating temperature may be set generally at 50° C., preferably at 60° C., and more preferably at 70° C., and the upper limit of the heating temperature may be set generally at 300° C., preferably at 250° C., and more preferably at 210° C. In this case, if the heating temperature is less than 50° C., the polysuccinimide based (co)polymer as the raw material would not be thoroughly fluidized and a part thereof would be dispersed in its originally powdered form and the chain extender would not act sufficiently on the polysuccinimide based (co)polymer and thus the molecular weight would not be increased to a full extent. In contrast, if the heating temperature exceeds 300° C., the polysuccinimide based (co)polymer as the raw material would be decomposed and thus the increase of the molecular weight of the polysuccinimide based (co)polymer would not be attained fully satisfactorily. The heating time likewise may be varied with the kinds of polysuccinimide based (co)polymer as the raw material, chain extender, and solvent of a low boiling temperature and a high dielectric constant ratio to be used and the conditions such as heating temperature. The lower limit of the heating time may be set generally at one minute and preferably at five minutes, and the upper limit of the heating time may be set generally at 72 hours and preferably at 48 hours.

Further, in the method of this invention, the other reaction conditions may be varied with the kinds of polysuccinimide based (co)polymer as the raw material and solvent of a low boiling temperature and a high dielectric constant ratio to be used and, therefore, can be suitably selected. The reaction may be performed under pressure of any status such as, for example, an increased pressure, a normal pressure, or a reduced pressure. The temperature and the pressure may be preferably maintained at respectively constant levels throughout the course of the reaction in consideration of the stabilization of the product in quality. More preferably, the refluxing temperature of the solvent may be set at the level which exists at the reaction temperature under the reaction pressure of the reaction system.

For the purpose of promoting the increase of the molecular weight of the polysuccinimide based (co)polymer as the raw material in this invention, the heating of the polysuccinimide based (co)polymer is preferred to be carried out additionally in the presence of an acid catalyst.

The acid catalyst to be used herein is not particularly limited but may be selected among the well-known acid catalysts. As concrete examples thereof, sulfuric acid, phosphoric acid, boric acid, paratoluenesulfonic acid, phosphorous acid, and phosphorous esters may be cited. Among other acid catalysts enumerated above, phosphoric acid and boric acid may be used particularly advantageously. The amount of such an acid catalyst to be used may be properly decided, depending on the kinds and amounts of the solvent and chain extender to be used and the reaction conditions. The lower limit of the amount of the acid catalyst to be used may be set preferably at 0.05% by weight and more preferably at 0.1% by weight, based on the amount of the polysuccinimide based (copolymer, and the upper limit of the amount of the acid catalyst to be used may be set preferably at 50% by weight and more preferably at 40% by weight, based on the amount of the polysuccinimide based (co)polymer. The time at which the acid catalyst is added to the polysuccinimide based (co)polymer as the raw material does not need to be particularly limited. The acid catalyst may be collectively added together with the polymer or it may be added collectively or sequentially to the polymer.

By this method, the increase of the molecular weight of the polysuccinimide based (co)polymer can be accomplished by a simple procedure without requiring any use of an organic solvent.

The polysuccinimide based (co)polymer of an increased molecular weight which has been produced as described above can be used for various applications such as, for example, an absorbent resin (material), a detergent, a builder for a detergent , a scale preventing agent, a chelating agent, a moisture retaining agent, a dispersant, and a fertilizer additive or as raw materials therefor. More specifically, an absorbent resin (material) may be produced by any of the known methods such as disclosed in JP-A-11-5,840, JP-A-11-5,838, JP-A-11-1,559, JP-A-11-1,557, JP-A-10-292,044, and JP-A-10-511,423, using the polysuccinimide based (co) polymer which is produced by the method of production of this invention.

Further, since the polysuccinimide based (co)polymer of an increased molecular weight according to this invention, on being hydrolyzed by addition of an alkali, can be converted into biodegradable polyaspartic acid, it is at an advantage in promising easy disposal of waste and allowing effective use as a biodegradable resin material.

Now, this invention will be described more specifically below with reference to working examples.

A molecular weight was determined by means of gel permeation chromatography (GPC) under the following conditions. The calibration curves were produced by using a polyethylene glycol standard made by Scientific Polymer Product Corp. As the molecular weights of samples, peak top molecular weights were adopted because all the samples were found to have relatively simple dispersions (Mw/Mn within 2) invariably.

<Method for Determination of Molecular Weight>

| Detector: | RI | |
| --- | --- | --- |
| Column: | Shodex Ohpak KF-G | |
| | Shodex Ohpak SB-805HQ | |
| | Shodex Ohpak KB-803 | |
| | Shodex Ohpak KB-803 | |
| | Shodex Ohpak KB-802.5 | |
| Carrier: | $NaH_2PO_4 2H_2O$ | 15.6 g |
| | NaCl | 11.7 g |
| | Water | 1000.0 g |
| | pH | 7.0 |
| Flow volume: | 1.0 ml/min | |
| Temperature: | 40° C. | |

PREPARATION EXAMPLE 1

In an eggplant type flask, 245 g of maleic anhydride and 500 g of water were placed and left dissolving. To the resultant solution, 170 g of an aqueous 25% ammonia solution was slowly added dropwise so as to avoid bumping. When the resultant solution was homogenized, it was heated in a rotary evaporator with the temperature of an oil bath kept at 100° C. and vacuum-concentrated till separation of crystals. The monoammonium maleate consequently obtained was transferred into a stainless steel pad and heated therein with a hot air drier at a temperature of 180° C. for three hours. The hot compound was cooled to obtain a polysuccinimide having a molecular weight of 6720.

PREPARATION EXAMPLE 2

1 kg of L-aspartic acid was placed in a stainless steel pad, and 1 kg of water was additionally introduced thereto. Then, the resultant mixture was heated therein with a hot air drier at a temperature of 205° C. for 18 hours. The hot compound was cooled to obtain a polysuccinimide. The molecular weight of the resultant polysuccinimide was determined to find to be 8960.

PREPARATION EXAMPLE 3

In an eggplant type flask, 122.5 g of maleic anhydride and 250 g of water were placed and left dissolving. To the resultant solution, 85 g of an aqueous 25% ammonia solution was slowly added dropwise. When the resultant solution was homogenized, it was heated in a rotary evaporator with the temperature of an oil bath kept at 100° C. and vacuum-concentrated till separation of crystals. The monoammonium maleate consequently obtained was transferred into a stainless steel pad and heated therein with a hot air drier at a temperature of 185° C. for 2.5 hours. The hot compound was cooled to obtain a polysuccinimide having a molecular weight of 3950.

EXAMPLE 1

When 10 g of the polysuccinimide powder obtained in Preparation Example 1 and 6 g of water were placed in an eggplant type flask and heated on a hot water bath at 130° C., the system assumed a homogeneously dissolved state in about six minutes to afford a homogeneous fluidized substance of polysuccinimide. This fluidized substance of polysuccinimide was then poured onto a stainless steel pad covered with a sheet of tetrafluoroethylene resin and thoroughly deprived of water by hot air drying at 65° C. for five-hours to afford a sheet-like molded product of about 3 mm in thickness.

The sheet-like molded product of polysuccinimide thus obtained was weighed to find 6 g, indicating no change in the weight of the polysuccinimide as the raw material. It is, therefore, observed that the treatment in this experiment induced no decomposition of the polysuccinimide.

EXAMPLE 2

When 10 g of the polysuccinimide powder obtained in Preparation Example 1 and 20 g of water were placed in an eggplant type flask and heated on a hot water bath at 130° C., the system assumed a homogeneously dissolved state in about 12 minutes to afford a homogeneous fluidized substance of polysuccinimide. Then, this fluidized substance of polysuccinimide was swept with a current of air to expel a small amount (about 10 g) of water and adjust the viscosity thereof properly (about 5 Pa·sec). A sheet-like molded product having a thickness of about 3 mm was obtained by following the procedure of Example 1 while using the fluidized substance of polysuccinimide of properly adjusted viscosity instead.

The sheet-like molded product of polysuccinimide thus obtained was weighed to find 10 g, indicating no change in the weight of the polysuccinimide as the raw material. It is, therefore, inferred that the treatment in this experiment induced no decomposition of the polysuccinimide.

EXAMPLE 3

When 10 g of the polysuccinimide powder obtained in Preparation Example .1 and 10 g of water were placed in an eggplant type flask and heated on a hot water bath at 130° C., the system assumed a homogeneously dissolved state in about 10 minutes to afford a homogeneous fluidized substance of polysuccinimide. Then, this fluidized substance of polysuccinimide was swept with a current of argon gas to expel a small amount (about 5 g) of water and adjust the viscosity thereof properly (about 10 Pa·sec). A sheet-like molded product having a thickness of about 3 mm was obtained by following the procedure of Example 1 while using the fluidized substance of polysuccinimide of properly adjusted viscosity instead.

The sheet-like molded product of polysuccinimide thus obtained was weighed to find 10 g, indicating no change in the weight of the polysuccinimide as the raw material. It is, therefore, observed that the treatment in this experiment induced no decomposition of the polysuccinimide.

EXAMPLE 4

When 10 g of the polysuccinimide powder obtained in Preparation Example 1 and 5 g of water were placed in an eggplant type flask and heated on a hot water bath at 130° C., the system assumed a homogeneously dissolved state in about 4 minutes to afford a homogeneous fluidized substance of polysuccinimide. Then, this fluidized substance of polysuccinimide was swept with a current of nitrogen gas to expel a small amount (about 2 g) of water and adjust the viscosity thereof properly (about 50 Pa·sec). A sheet-like molded product having a thickness of about 3 mm was obtained by following the procedure of Example 1 while using the polysuccinimide fluid of properly adjusted viscosity instead.

The sheet-like molded product of polysuccinimide thus obtained was weighed to find 10 g, indicating no change in the weight of the polysuccinimide as the raw material. It is, therefore, observed that the treatment in this experiment induced no decomposition of the polysuccinimide.

EXAMPLE 5

When 50 g of the polysuccinimide powder obtained in Preparation Example 1 and 50 g of water were placed in an eggplant type flask, the polysuccinimide was fluidized in five minutes. This fluidized substance of polysuccinimide was pored into a stainless steel pad and dried with a hot air drier at a temperature of 160° C. for three hours.

When the molecular weight of the polysuccinimide of an increased molecular weight obtained as described above was determined by the method mentioned above, it was found to be 7,148.

EXAMPLE 6

When 50 g of the polysuccinimide powder obtained in Preparation Example 1, 50 g of water, and 5 g of maleic acid monoamide as a chain extender were placed in an eggplant type flask, the polysuccinimide was fluidized in five minutes. This fluidized substance of polysuccinimide was pored into a stainless steel pad and dried with a hot air drier at a temperature of 160° C. for three hours.

When the molecular weight of the polysuccinimide of an increased molecular weight obtained as described above was determined by the method mentioned above, it was found to be 7,332.

EXAMPLE 7

When 30 g of the polysuccinimide powder obtained in Preparation Example 1, 30 g of water, and 3 g of phosphoric acid as an acid catalyst were placed in an eggplant type flask, the polysuccinimide was fluidized in five minutes. This fluidized substance of polysuccinimide was pored into a stainless steel pad and dried with a hot air drier at a temperature of 160° C. for three hours.

When the molecular weight of the polysuccinimide of an increased molecular weight obtained as described above was determined by the method mentioned above, it was found to be 7,405.

EXAMPLE 8

When 0 g of the polysuccinimide powder obtained in Preparation Example 1, 30 g of water, 10 g of maleic acid monoamide as a chain extender, and 3 g of phosphoric acid as an acid catalyst were placed in an eggplant type flask, the polysuccinimide was fluidized in five minutes. This fluidized substance of polysuccinimide was pored into a stainless steel pad and dried with a hot air drier at a temperature of 160° C. for three hours.

When the molecular weight of the polysuccinimide of an increased molecular weight obtained as described above was determined by the method mentioned above, it was found to be 8,509.

EXAMPLE 9

A slurry was prepared by thoroughly mixing 30 g of the polysuccinimide powder obtained in Preparation Example 3 with 20 g of water. Then, the resultant slurry was placed in Laboplastomill™ (produced by TOYO SEIKI SEISAKU-SHO, LTD.) of 30 ml in an inner volume and reacted at 260° C. for 4 hours while stirred (rotation number of rotor: 50 rpm). The molecular weight of the resultant product was determined by the method mentioned above, it was found to be 4,290.

EXAMPLE 10

A slurry was prepared by thoroughly mixing 20 g of the polysuccinimide powder obtained in Preparation Example 3 with 15 g of water, 5 g of L-aspartic acid as a chain extender and 5 g of an aqueous 85% phosphoric acid solution as an acid catalyst. Then, the resultant slurry was placed in Laboplastomill™ (produced by TOYO SEIKI SEISAKU-SHO, LTD.) of 30 ml in an inner volume and reacted at 230° C. for 0.5 hour while stirred (rotation number of rotor: 50 rpm). The molecular weight of the resultant product was determined by the method mentioned above, it was found to be 4,620.

Control 1

5 g of the polysuccinimide powder obtained in Preparation Example 2 was placed in a beaker and heated with a hot air drier at a temperature of 205° C. for 2 hours. The hot compound was cooled to obtain a powdery polysuccinimide having a molecular weight of 9,700.

EXAMPLE 11

5 g of the polysuccinimide powder obtained in Preparation Example 2 and 2.5 g of water were placed in a beaker and heated with a hot air drier at a temperature of 205° C. for 2 hours. The hot compound was cooled to obtain a bulky polysuccinimide having a molecular weight of 10,010.

EXAMPLE 12

5 g of the polysuccinimide powder obtained in Preparation Example 2 and 5 g of water were placed in a beaker and heated with a hot air drier at a temperature of 205° C. for 2 hours. The hot compound was cooled to obtain a bulky polysuccinimide having a molecular weight of 11,140.

EXAMPLE 13

5 g of the polysuccinimide powder obtained in Preparation Example 2 and 10 g of water were placed in a beaker and heated with a hot air drier at a temperature of 205° C. for 2 hours. The hot compound was cooled to obtain a bulky polysuccinimide having a molecular weight of 11,800.

EXAMPLE 14

5 g of the polysuccinimide powder obtained in Preparation Example 2, 5 g of the polysuccinimide as a chain extender obtained in Example 13 and 10 g of water were placed in a beaker and heated with a hot air drier at a temperature of 205° C. for 2 hours. The hot compound was cooled to obtain a bulky polysuccinimide having a molecular weight of 25,994.

EXAMPLE 15

When 10 g of the polysuccinimide powder obtained in Preparation Example 2 and 10 g of a mixed solvent of 5 g of water and 5 g of ethanol were placed in an eggplant type flask and heated on a hot oil bath at 130° C., the system assumed a homogeneously dissolved state in about 6 minutes to afford a homogeneous fluidized substance of polysuccinimide. Then, this fluidized substance of polysuccinimide was swept with a current of air to expel a small amount (about 5 g) of water and adjust the viscosity thereof properly (about 10 Pa·sec). A sheet-like molded product having a thickness of about 3 mm was obtained by following the procedure of Example 1 while using the polysuccinimide fluid of properly adjusted viscosity instead.

When the molecular weight of the polysuccinimide thus obtained was determined by the method mentioned above, it was found to be 9,120.

EXAMPLE 16

When 10 g of the polysuccinimide powder obtained in Preparation Example 2 and 10 g of a mixed solvent of 5 g of water and 5 g of ethyl acetate were placed in an eggplant type flask and heated on a hot oil bath at 130° C., the system assumed a homogeneously dissolved state in about 6 minutes to afford a homogeneous fluidized substance of polysuccinimide. Then, this fluidized substance of polysuccinimide was swept with a current of air to expel a small amount (about 5 g) of water and adjust the viscosity thereof properly (about 10 Pa·sec). A sheet-like molded product having a thickness of about 3 mm was obtained by following the procedure of Example 1 while using the polysuccinimide fluid of properly adjusted viscosity instead.

When the molecular weight of the polysuccinimide thus obtained was determined by the method mentioned above, it was found to be 9,410.

EXAMPLE 17

When 10 g of the polysuccinimide powder obtained in Preparation Example 2 and 10 g of a mixed solvent of 5 g of water and 5 g of toluene were placed in an eggplant type flask and heated on a hot water bath at 130° C., the system assumed a homogeneously dissolved state in about 6 minutes to afford a homogeneous fluidized substance of polysuccinimide. Then, this fluidized substance of polysuccinimide was swept with a current of air to expel a small amount (about 5 g) of water and adjust the viscosity thereof properly (about 10 Pa·sec). A sheet-like molded product having a thickness of about 3 mm was obtained by following the procedure of Example 1 while using the polysuccinimide fluid of properly adjusted viscosity instead.

When the molecular weight of the polysuccinimide thus obtained was determined by the method mentioned above, it was found to be 8,980.

EXAMPLE 18

15 g of the polysuccinimide powder obtained in Preparation Example 2, 5 g of water and 5 g of polyethylene succinate as a molding auxiliary were placed in Laboplastomill™ (produced by TOYO SEIKI SEISAKU-SHO, LTD.) of 30 ml in an inner volume and reacted at 230° C. for 0.5 hour while stirred (rotation number of rotor: 50 rpm), to obtain a bulky product. Since the bulky product thus obtained was insoluble in the solvent, the molecular weight thereof could not be determined, but it was weighed to find 20 g, indicating no change in the weight of the polysuccinimide and the molding auxiliary as the raw materials. It is, therefore, observed that the treatment in this experiment induced no decomposition of the polysuccinimide.

The results of Examples 5 to 18 and Control 1 were summarized in Table 1 below.

TABLE 1

| Example | Molecular weight of polysuccinimide as raw material | Chain extender | Acid catalyst | Molecular weight of produced polysuccinimide |
| --- | --- | --- | --- | --- |
| 5 | 6720 | — | — | 7148 |
| 6 | 6720 | Maleic acid monoamide | — | 7332 |
| 7 | 6720 | Phosphoric acid | — | 7405 |
| 8 | 6720 | Maleic acid monoamide | Phosphoric acid | 8509 |
| 9 | 3950 | — | — | 4290 |
| 10 | 3950 | L-aspartic acid | Phosphoric acid | 4620 |
| 11 | 8960 | — | — | 10010 |
| 12 | 8960 | — | — | 11140 |
| 13 | 8960 | — | — | 11800 |
| 14 | 8960 | Polysuccinimide | — | 25994 |
| 15 | 8960 | — | — | 9120 |
| 16 | 8960 | — | — | 9410 |
| 17 | 8960 | — | — | 8980 |
| 18 | 8960 | — | — | — |
| Control 1 | 8960 | — | — | 9700 |

The results of Table 1 indicate that when polysuccinimide was heated in the presence of both a chain extender and an acid catalyst, the increase of molecular weight of the polysuccinimide as the raw material could be significantly attained as compared with the case of using only either of the additives or the case of omitting the use.

The entire disclosure of Japanese patent application Nos. 10-332,708 and 10-332,709 filed on Nov. 24, 1999 and Nov. 24, 1999 including specification, claims, drawings and summary are incorporated herein by reference in its entirety.

What is claimed is:

1. A method for the molding of a polymer whose glass transition temperature closely approximates its decomposition temperature, said method comprises heating and melting said polymer in the presence of a solvent having a low boiling point and a high dielectric constant ratio and then molding the resultant molten product.

2. A method according to claim 1, wherein said polymer is a polysuccinimide based polymer and/or copolymer.

3. A method according to claim 1, wherein said solvent has a boiling temperature in the range of 50° to 150° C. and a dielectric constant ratio at 20° C. of not less than 20.

4. A method according to claim 1, wherein said solvent is water.

5. A method according to claim 1, wherein the heating and melting process is carried out in the presence of a chain extender.

6. A method according to claim 1, wherein the heating and melting process is carried out in the presence of an acid catalyst.

* * * * *